US011508958B2

(12) United States Patent
Nakayama

(10) Patent No.: US 11,508,958 B2
(45) Date of Patent: Nov. 22, 2022

(54) NON-AQUEOUS ELECTROLYTE SECONDARY BATTERY

(71) Applicant: TOYOTA JIDOSHA KABUSHIKI KAISHA, Toyota (JP)

(72) Inventor: Tetsuri Nakayama, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 338 days.

(21) Appl. No.: 17/000,651

(22) Filed: Aug. 24, 2020

(65) Prior Publication Data

US 2021/0075006 A1 Mar. 11, 2021

(30) Foreign Application Priority Data

Sep. 10, 2019 (JP) .............................. JP2019-164879

(51) Int. Cl.
| | |
|---|---|
| *H01M 4/36* | (2006.01) |
| *H01M 4/66* | (2006.01) |
| *H01M 10/0525* | (2010.01) |
| *H01M 4/62* | (2006.01) |
| *H01M 4/02* | (2006.01) |

(52) U.S. Cl.
CPC ............ *H01M 4/366* (2013.01); *H01M 4/624* (2013.01); *H01M 4/661* (2013.01); *H01M 10/0525* (2013.01); *H01M 2004/027* (2013.01); *H01M 2004/028* (2013.01)

(58) Field of Classification Search
None
See application file for complete search history.

(56) References Cited

U.S. PATENT DOCUMENTS

| 2012/0115030 A1 | 5/2012 | Tanaka et al. |
| 2015/0132659 A1* | 5/2015 | Tanaka ................ H01M 4/0435 |
| | | 429/246 |
| 2017/0358794 A1* | 12/2017 | Lee .................... H01M 10/0525 |
| 2019/0013543 A1 | 1/2019 | Tao et al. |

FOREIGN PATENT DOCUMENTS

| JP | 2012-114079 A | 6/2012 |
| JP | 2017-143004 A | 8/2017 |
| JP | 2019-16483 A | 1/2019 |
| KR | 10-2012-0048508 A | 5/2012 |
| KR | 10-2017-0140633 A | 12/2017 |

* cited by examiner

*Primary Examiner* — Wyatt P McConnell
(74) *Attorney, Agent, or Firm* — Sughrue Mion, PLLC

(57) ABSTRACT

A non-aqueous electrolyte secondary battery disclosed herein includes a positive electrode, a negative electrode, and a non-aqueous electrolyte. The positive electrode includes a positive electrode current collector, and a positive electrode active material layer, an insulating layer, and a boundary layer which are provided on the positive electrode current collector. The boundary layer is positioned between the positive electrode active material layer and the insulating layer, and is in contact with the positive electrode active material layer and the insulating layer. The positive electrode active material layer contains a positive electrode active material. The insulating layer contains an inorganic filler. The boundary layer contains the positive electrode active material contained in the positive electrode active material layer and the inorganic filler contained in the insulating layer. The boundary layer contains hydrated alumina. The non-aqueous electrolyte contains lithium fluorosulfonate.

5 Claims, 3 Drawing Sheets

NON-AQUEOUS ELECTROLYTE SECONDARY BATTERY

INCORPORATION BY REFERENCE

The disclosure of Japanese Patent Application No. 2019-164879 filed on Sep. 10, 2019 including the specification, drawings and abstract is incorporated herein by reference in its entirety.

BACKGROUND

1. Technical Field

The present disclosure relates to a non-aqueous electrolyte secondary battery.

2. Description of Related Art

In recent years, a non-aqueous electrolyte secondary battery such as a lithium ion secondary battery is suitably used in a portable power supply for personal computers, portable terminals, or the like, and a power supply for vehicle drive of electric vehicles (EV), hybrid vehicles (HV), plug-in hybrid vehicles (PHV), or the like.

A positive electrode of the non-aqueous electrolyte secondary battery generally has a configuration in which a positive electrode active material layer is provided on a positive electrode current collector. Also, the positive electrode generally has a portion where the positive electrode current collector is exposed without providing a positive electrode active material layer, for the purpose of current collection. In order to suppress a short circuit between a positive electrode and a negative electrode, a technique of providing an insulating layer at a boundary between the portion where the positive electrode current collector is exposed and a positive electrode active material layer is known (for example, see Japanese Unexamined Patent Application Publication No. 2012-114079 (JP 2012-114079 A)).

JP 2012-114079 A discloses that a positive electrode active material layer and an insulating layer can be prevented from peeling or falling off from a positive electrode current collector, by providing a phase (or a layer), in which components of the positive electrode active material layer and the insulating layer are mixed, at a boundary between the positive electrode active material layer and the insulating layer.

SUMMARY

However, as a result of intensive studies by the present inventor, it was found that in the related art described above, there is a problem that a battery capacity deteriorates when charge and discharge are repeated at a high rate.

The present disclosure provides a non-aqueous electrolyte secondary battery in which capacity deterioration when charge and discharge are repeated at a high rate is suppressed.

An aspect of the present disclosure relates to a non-aqueous electrolyte secondary battery including a positive electrode, a negative electrode, and a non-aqueous electrolyte. The positive electrode includes a positive electrode current collector, and a positive electrode active material layer, an insulating layer, and a boundary layer which are provided on the positive electrode current collector. The boundary layer is positioned between the positive electrode active material layer and the insulating layer, and is in contact with the positive electrode active material layer and the insulating layer. The positive electrode active material layer contains a positive electrode active material. The insulating layer contains an inorganic filler. The boundary layer contains the positive electrode active material contained in the positive electrode active material layer and the inorganic filler contained in the insulating layer. The boundary layer contains hydrated alumina. The non-aqueous electrolyte contains lithium fluorosulfonate.

With the configuration, there is provided a non-aqueous electrolyte secondary battery in which capacity deterioration when charge and discharge are repeated at a high rate is suppressed.

The hydrated alumina may have an average particle diameter of 0.5 μm or greater and 3 μm or smaller.

With the configuration, resistance to capacity deterioration when charge and discharge are repeated at a high rate particularly increases, and deterioration of the positive electrode active material can be effectively suppressed.

The non-aqueous electrolyte may further contain lithium bis(oxalato)borate.

With the configuration, the resistance to capacity deterioration when charge and discharge are repeated at a high rate increases more.

The non-aqueous electrolyte may further contain lithium difluorophosphate.

With the configuration, the resistance to capacity deterioration when charge and discharge are repeated at a high rate increases more.

The hydrated alumina may be aluminum oxyhydroxide.

With the configuration, the resistance to capacity deterioration when charge and discharge are repeated at a high rate increases more.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
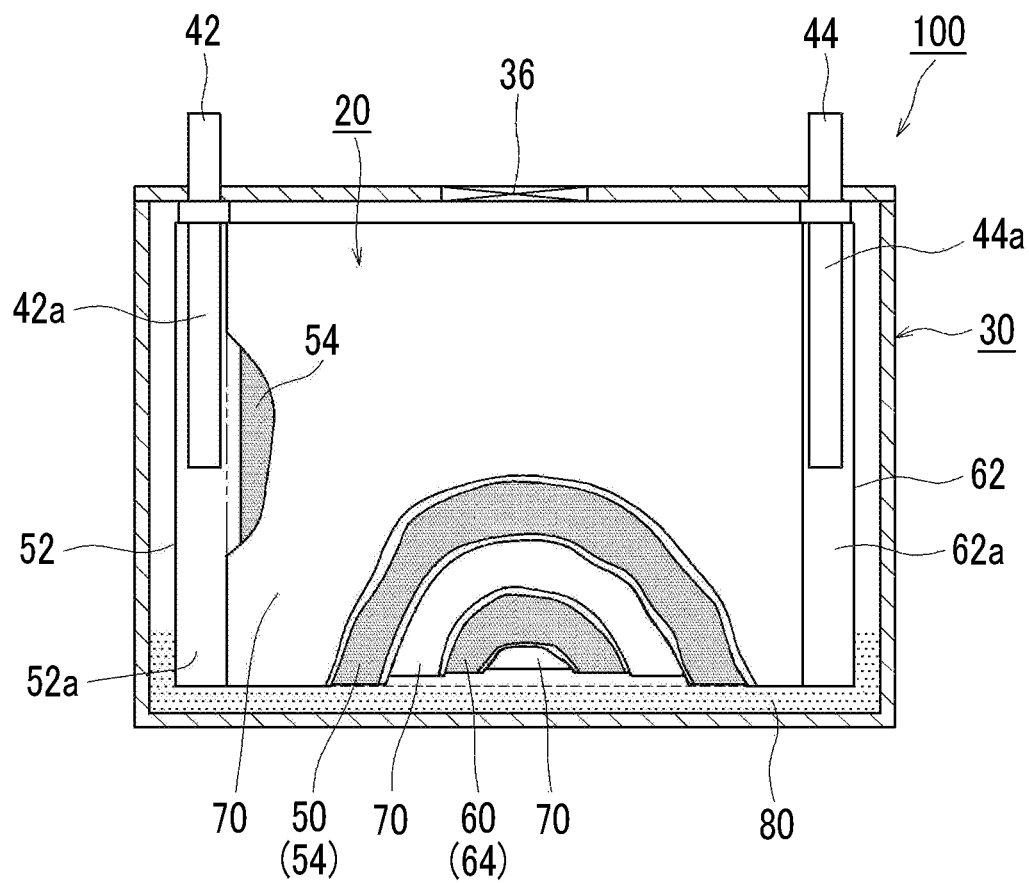
FIG. 1 is a sectional view schematically showing an internal structure of a lithium ion secondary battery according to an embodiment of the present disclosure.

Hereinafter, embodiments of the present disclosure will be described with reference to the drawings. Matters other than those specifically mentioned in the present specification, which are needed for carrying out the present disclosure (for example, a general configuration and a manufacturing process of a non-aqueous electrolyte secondary battery which does not characterize the present disclosure) can be grasped as design matters of those skilled in the art based on conventional techniques in the field. The present disclosure can be implemented based on the contents disclosed in the present specification and common technical knowledge in the field. In the following drawings, members and portions having the same function are denoted by the same reference numerals. The dimensional relationships (such as length, width, and thickness) in each drawing do not reflect actual dimensional relationships.

In the present specification, a "secondary battery" generally refers to a power storage device that can be repeatedly charged and discharged, and is a term that includes a so called storage battery and a power storage element such as an electric double layer capacitor.

Also, a "non-aqueous electrolyte secondary battery" refers to a battery provided with a non-aqueous electrolyte (typically, a non-aqueous electrolyte containing a supporting electrolyte in a non-aqueous solvent).

Hereinafter, the present disclosure will be described in detail using an example of a flat rectangular lithium ion secondary battery having a flat wound electrode body and a flat battery case, but it is not intended that the present disclosure is limited to those described in such embodiments.

A lithium ion secondary battery 100 shown in FIG. 1 is a sealed battery configured by housing a flat wound electrode body 20 and a non-aqueous electrolyte 80 in a flat rectangular battery case (that is, an outer container) 30. The battery case 30 is provided with a positive electrode terminal 42 and a negative electrode terminal 44 for external connection, and a thin safety valve 36 set to release internal pressure when the internal pressure of the battery case 30 increases to a predetermined level or higher. In addition, the battery case 30 is provided with an inlet (not shown) for injecting the non-aqueous electrolyte 80. The positive electrode terminal 42 is electrically connected to a positive electrode current collector plate 42a. The negative electrode terminal 44 is electrically connected to a negative electrode current collector plate 44a. As a material of the battery case 30, for example, a metal material, which is good in heat conductivity with lightweight, such as aluminum is used. FIG. 1 does not accurately represent the amount of the non-aqueous electrolyte 80.

Figure 2:
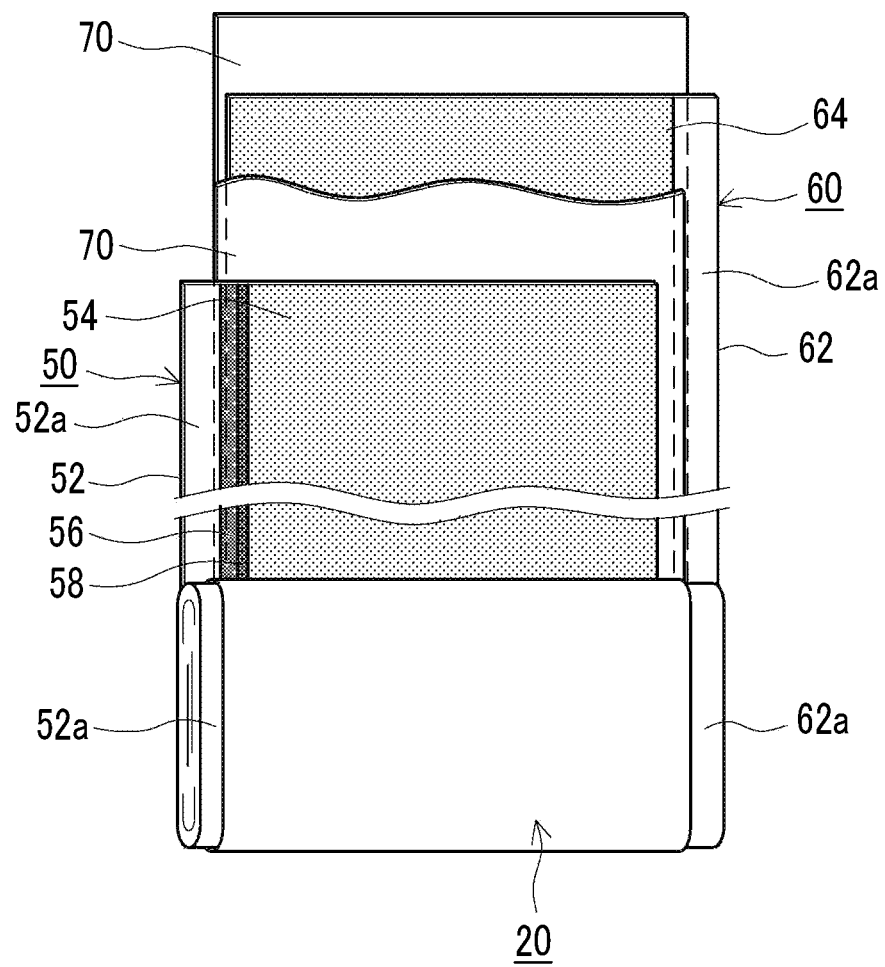
FIG. 2 is a schematic view showing a configuration of a wound electrode body of a lithium ion secondary battery according to an embodiment of the present disclosure.

As shown in FIGS. 1 and 2, the wound electrode body 20 is configured such that a long positive electrode sheet 50 and a long negative electrode sheet 60 are overlapped via two long separator sheets 70. The laminated body has a form wound in the longitudinal direction.

Figure 3:
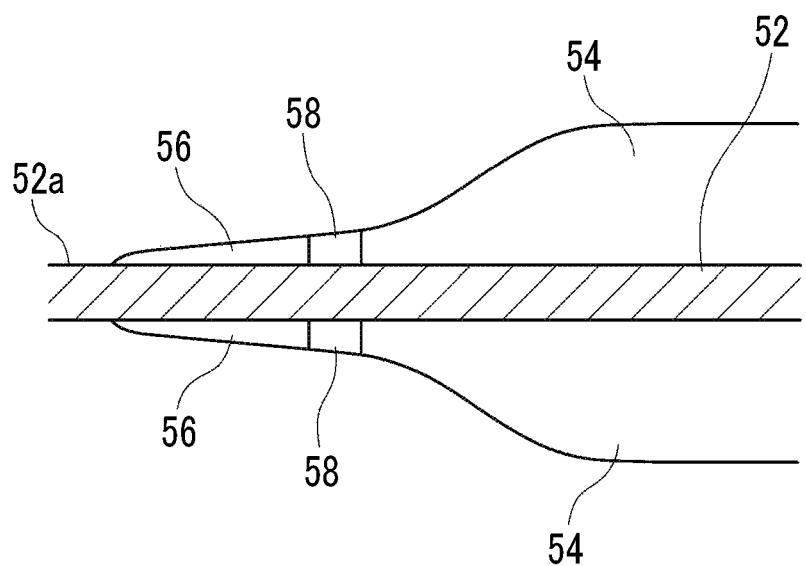
FIG. 3 is a schematic partial sectional view of a positive electrode of a lithium ion secondary battery according to an embodiment of the present disclosure.

As shown in FIGS. 2 and 3, the positive electrode sheet 50 has a long positive electrode current collector 52 and a positive electrode active material layer 54 formed on the positive electrode current collector 52. In examples of the drawings, the positive electrode active material layer 54 is provided on each of both surfaces of the positive electrode current collector 52, but may be provided on one surface.

In addition, the positive electrode current collector 52 has a portion (a positive electrode current collector exposed portion) 52a where the positive electrode current collector 52 is exposed without forming the positive electrode active material layer 54. As shown in FIG. 2, the positive electrode current collector exposed portion 52a is formed so as to protrude outward from one end of the wound electrode body 20 in a winding axis direction (that is, the sheet width direction perpendicular to the longitudinal direction). The positive electrode current collector plate 42a is joined to the positive electrode current collector exposed portion 52a.

In addition, the positive electrode sheet 50 includes an insulating layer 56 formed on the positive electrode current collector 52 and a boundary layer 58 formed on the positive electrode current collector 52.

The insulating layer 56 is provided along an end of the positive electrode active material layer 54 on a positive electrode current collector exposed portion 52a side, and the insulating layer 56 extends along the longitudinal direction of the positive electrode sheet 50. The insulating layer 56 is positioned between the positive electrode active material layer 54 and the positive electrode current collector exposed portion 52a in the width direction of the positive electrode sheet 50.

The boundary layer 58 is provided at a boundary between the insulating layer 56 and the positive electrode active material layer 54, and the boundary layer 58 extends along the longitudinal direction of the positive electrode sheet 50. Therefore, the boundary layer 58 is positioned between the positive electrode active material layer 54 and the insulating layer 56. In addition, the boundary layer 58 is in contact with both the positive electrode active material layer 54 and the insulating layer 56.

In examples of the drawings, the insulating layer 56 is provided on each of both surfaces of the positive electrode current collector 52, but may be provided on one surface. In examples of the drawings, the boundary layer 58 is provided on each of both surfaces of the positive electrode current collector 52, but may be provided on one surface.

An outline of sectional shape of the positive electrode active material layer 54, the insulating layer 56, and the boundary layer 58 illustrated in FIG. 3 is not limited to that shown in FIG. 3.

Examples of the positive electrode current collector 52 configuring the positive electrode sheet 50 include an aluminum foil.

The positive electrode active material layer 54 contains a positive electrode active material. As the positive electrode active material, a known positive electrode active material used for a lithium secondary battery may be used. Specifically, for example, a lithium composite oxide or a lithium transition metal phosphate compound can be used. A crystal structure of the positive electrode active material is not particularly limited, and may be a layered structure, a spinel structure, an olivine structure, or the like.

As the lithium composite oxide, a lithium transition metal composite oxide containing at least one of Ni, Co, and Mn as a transition metal element is preferable. Specific examples of the lithium transition metal element include a lithium nickel-based composite oxide, a lithium cobalt-based composite oxide, a lithium manganese-based composite oxide, a lithium nickel manganese-based composite oxide, a lithium nickel cobalt manganese-based composite oxide, a lithium nickel cobalt aluminum-based complex oxide, and a lithium iron nickel manganese-based composite oxide.

Since an initial resistance is small, the lithium composite oxide preferably has a layered structure. The lithium composite oxide is more preferably a lithium nickel cobalt manganese-based composite oxide having a layered structure. A content of the nickel relative to a total content of the nickel, manganese, and cobalt in the lithium nickel manganese cobalt-based composite oxide is not particularly limited, but is preferably 34 mol % or more. In this case, a resistance of the lithium ion secondary battery 100 decreases and the capacity increases.

In the present specification, the "lithium nickel cobalt manganese-based composite oxide" is a term including, in addition to an oxide having Li, Ni, Co, Mn, and O as a constituent element, and an oxide including one or more kinds of additional elements. Examples of the additional element include transition metal elements such as Mg, Ca, Al, Ti, V, Cr, Si, Y, Zr, Nb, Mo, Hf, Ta, W, Na, Fe, Zn, and Sn and typical metal elements. In addition, the additional element may be semimetal elements such as B, C, Si, and P, and nonmetal elements such as S, F, Cl, Br, and I. The same is applied to the lithium nickel-based composite oxide, the lithium cobalt-based composite oxide, the lithium manganese-based composite oxide, the lithium nickel manganese-based composite oxide, the lithium nickel cobalt aluminum-based complex oxide, and the lithium iron nickel manganese-based composite oxide.

Suitably, a lithium nickel manganese cobalt-based composite oxide represented by the following formula (I) can be used as the positive electrode active material.

  (I)

Here, a satisfies 0.98≤a≤1.20. x, y, and z satisfy x+y+z=1. x preferably satisfies 0.20≤x≤0.60, and more preferably satisfies 0.34≤x≤0.60. y preferably satisfies 0<y≤0.50, and more preferably satisfies 0<y≤0.40. z preferably satisfies 0<z≤0.50, and more preferably satisfies 0<z≤0.40.

Examples of the lithium transition metal phosphate compound include lithium iron phosphate (LiFePO$_4$), lithium manganese phosphate (LiMnPO$_4$), and lithium iron manganese phosphate.

An average particle diameter (median diameter D50) of the positive electrode active material particles is not particularly limited, and is, for example, 0.05 μm or greater and 20 μm or smaller, preferably 0.5 μm or greater and 15 μm or smaller, and more preferably 3 μm or greater and 15 μm or smaller.

The average particle diameter (median diameter D50) of the positive electrode active material particles can be determined by, for example, a laser diffraction scattering method.

The positive electrode active material layer 54 may include a component in addition to the positive electrode active material. Examples of the component include tri-lithium phosphate (Li$_3$PO$_4$), a conductive material, and a binder.

As the conductive material, for example, carbon black such as acetylene black (AB) and other carbon materials such as graphite can be suitably used. The content of the conductive material with respect to the positive electrode active material is preferably 1% by mass or more and 20% by mass or less, and more preferably 3% by mass or more and 15% by mass or less.

As the binder, for example, polyvinylidene fluoride (PVdF) can be used. The content of the binder with respect to the positive electrode active material is preferably 1% by mass or more and 20% by mass or less, and more preferably 3% by mass or more and 15% by mass or less.

The content of the trilithium phosphate with respect to the positive electrode active material is preferably 1% by mass or more and 10% by mass or less.

The insulating layer 56 contains an inorganic filler.

A shape of the inorganic filler is not particularly limited, and may be a particle form, a fiber form, a plate form, a flake form, or the like.

An average particle diameter (median diameter D50) of the inorganic filler is not particularly limited, and is, for example, 0.01 μm or greater and 10 μm or smaller, preferably 0.1 μm or greater and 5 μm or smaller, and more preferably 0.5 μm or greater and 3 μm or smaller. The average particle diameter (median diameter D50) of the inorganic filler can be determined by, for example, a laser diffraction scattering method.

As the inorganic filler, a filler having an insulating property is used. Examples of a material of the inorganic filler include inorganic oxides (such as alumina, magnesia, silica, and titania), nitrides (such as aluminum nitride and silicon nitride), hydrated alumina, metal hydroxides other than the hydrated alumina (such as calcium hydroxide and magnesium hydroxide), clay minerals (such as mica, talc, zeolite, apatite, and kaolin), and glass fiber. The materials can be used alone or two or more thereof can be used in combination.

The insulating layer 56 typically contains a binder.

Examples of the binder include an acrylic binder, styrene butadiene rubber (SBR), and polyolefin-based binder. Also, fluorine-based polymers such as polyvinylidene fluoride (PVDF) and polytetrafluoroethylene (PTFE) can be used.

A content of the binder in the insulating layer 56 is not particularly limited, and is, for example, 1% by mass or more and 30% by mass or less, and preferably 3% by mass or more and 25% by mass or less.

The boundary layer 58 contains at least the positive electrode active material that the positive electrode active material layer 54 contains and the inorganic filler that the insulating layer 56 contains.

Typical examples of the boundary layer 58 include a layer in which above-described components of the positive electrode active material layer 54 and above-described components of the insulating layer 56 are mixed. Accordingly, the boundary layer 58 may contain a component of the positive electrode active material layer 54 and/or a component of the insulating layer 56, in addition to the positive electrode active material and the inorganic filler. For example, the boundary layer 58 further contains a binder of the positive electrode active material layer 54 and/or the insulating layer 56.

For example, when the positive electrode active material layer 54 contains a positive electrode active material, a conductive material, and a binder, and the insulating layer 56 contains an inorganic filler and a binder, the boundary layer 58 contains the positive electrode active material, the conductive material, the binder of the positive electrode active material layer 54, the inorganic filler, and the binder of the insulating layer 56.

The boundary layer 58 contains hydrated alumina.

In an embodiment in which the boundary layer 58 contains the hydrated alumina, the boundary layer 58 contains the hydrated alumina, in addition to the above-described positive electrode active material and the above-described inorganic filler.

In another embodiment in which the boundary layer 58 contains the hydrated alumina, the boundary layer 58 contains the above-described positive electrode active material and the above-described inorganic filler, and the inorganic filler is the hydrated alumina.

The hydrated alumina has a hydroxyl group.

Examples of the hydrated alumina include aluminum oxyhydroxide (AlOOH), which is a crystalline alumina monohydrate; aluminum hydroxide (Al(OH)$_3$), which is a crystalline alumina trihydrate; and alumina gel which is an amorphous hydrated alumina. The crystalline hydrated alumina (that is, crystalline alumina monohydrate and crystalline alumina trihydrate) may be either α-type or β-type, and is preferably α-type. The hydrated alumina is preferably aluminum oxyhydroxide, in that the resistance to capacity deterioration when charge and discharge are repeated at a high rate increases more.

An average particle diameter (median diameter D50) of the hydrated alumina is not particularly limited. When the average particle diameter of the hydrated alumina is too small, acid (particularly, HF) is likely to be generated in the non-aqueous electrolyte 80, which may cause deterioration of the positive electrode active material. Therefore, the average particle diameter of the hydrated alumina is preferably 0.5 μm or greater. On the other hand, when the average particle diameter of the hydrated alumina is too large, acid (particularly, HF) is difficult to be generated in the non-aqueous electrolyte 80, an effect of the hydrated alumina of improving the resistance to capacity deterioration when charge and discharge are repeated at a high rate tends to decrease. Therefore, the average particle diameter of the hydrated alumina is preferably 3 μm or smaller.

The average particle diameter (median diameter D50) of the hydrated alumina can be determined by, for example, a laser diffraction scattering method.

A content of the inorganic filler in the boundary layer 58 is not particularly limited. The content of the inorganic filler is preferably 10 parts by mass or more and 500 parts by mass or less, and more preferably 25 parts by mass or more and 250 parts by mass or less, with respect to 100 parts by mass of the positive electrode active material contained in the boundary layer.

A content of the hydrated alumina in the boundary layer 58 is not particularly limited. The content of the hydrated alumina is preferably 10 parts by mass or more and 500 parts by mass or less, and more preferably 25 parts by mass or more and 250 parts by mass or less, with respect to 100 parts by mass of the positive electrode active material contained in the boundary layer.

A method for forming the boundary layer 58 will be described. A paste for forming a positive electrode active material layer and a paste for forming an insulating layer are simultaneously or sequentially applied on the positive electrode current collector 52 such that the pastes are adjacent to each other, and the pastes are simultaneously dried. In this case, since both components are mixed at an interface between the paste for forming a positive electrode active material layer and the paste for forming an insulating layer before drying the pastes, the boundary layer 58 is formed at the interface between the positive electrode active material layer 54 and the insulating layer 56. The hydrated alumina can be contained in the boundary layer 58, by selecting the hydrated alumina as the inorganic filler of the paste for forming an insulating layer.

Alternatively, the positive electrode active material layer 54, the insulating layer 56, and the boundary layer 58 can be formed using the paste for forming a positive electrode active material layer, the paste for forming an insulating layer, and a paste for forming a boundary layer containing the hydrated alumina.

As shown in FIG. 2, the negative electrode sheet 60 includes a long negative electrode current collector 62 and a negative electrode active material layer 64 formed on the negative electrode current collector 62. In examples of the drawings, the negative electrode active material layer 64 is provided on each of both surfaces of the negative electrode current collector 62, but may be provided on one surface. In addition, the negative electrode current collector 62 has a portion (a negative electrode current collector exposed portion) 62a where the negative electrode current collector 62 is exposed without forming the negative electrode active material layer 64. The negative electrode current collector exposed portion 62a is formed so as to protrude outward from the other end of the wound electrode body 20 in the winding axis direction (that is, the sheet width direction perpendicular to the longitudinal direction). The negative electrode current collector plate 44a is joined to the negative electrode current collector exposed portion 62a.

Examples of the negative electrode current collector 62 configuring the negative electrode sheet 60 include a copper foil. The negative electrode active material layer 64 contains a negative electrode active material. As the negative electrode active material, for example, a carbon material such as graphite, hard carbon, and soft carbon can be used. The graphite may be natural graphite or artificial graphite, and may be amorphous carbon-coated graphite in which graphite is coated with an amorphous carbon material.

The negative electrode active material layer 64 may include a component such as a binder and a thickener, in addition to the negative electrode active material.

As the binder, for example, styrene-butadiene rubber (SBR) can be used.

As the thickener, for example, carboxymethyl cellulose (CMC) can be used.

A content of the negative electrode active material in the negative electrode active material layer is preferably 90% by mass or more, and more preferably 95% by mass or more and 99% by mass or less. A content of the binder in the negative electrode active material layer is preferably 0.1% by mass or more and 8% by mass or less, and more preferably 0.5% by mass or more and 3% by mass or less. A content of the thickener in the negative electrode active material layer is preferably 0.3% by mass or more and 3% by mass or less, and more preferably 0.5% by mass or more and 2% by mass or less.

Examples of the separator 70 include a porous sheet (film) made of a resin such as polyethylene (PE), polypropylene (PP), polyester, cellulose, or polyamide. The porous sheet may have a single-layer structure or a layered structure of two or more layers (for example, a three-layer structure in which a PP layer is layered on both surfaces of a PE layer). A heat-resistant layer (HRL) may be provided on a surface of the separator 70.

The non-aqueous electrolyte 80 contains lithium fluorosulfonate. The lithium fluorosulfonate is a component involved in the formation of a film on a surface of the active material.

The non-aqueous electrolyte typically contains a non-aqueous solvent and a supporting electrolyte (supporting salt).

As the non-aqueous solvent, various kinds of organic solvents such as carbonates, ethers, esters, nitriles, sulfones, and lactones used for electrolytes of general lithium ion secondary batteries can be used without particular limitation. Specific examples of the non-aqueous solvent include ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluorodimethyl carbonate (TFDMC). The non-aqueous solvents can be used alone or two or more kinds thereof can be used in an appropriate combination.

As the supporting salt, for example, a lithium salt such as $LiPF_6$, $LiBF_4$, and $LiClO_4$ (preferably $LiPF_6$) can be used. The concentration of the supporting salt is preferably 0.7 mol/L or higher and 1.3 mol/L or lower.

A content of the lithium fluorosulfonate in the non-aqueous electrolyte 80 is not particularly limited. When the content of the lithium fluorosulfonate is too small, the amount of film formation (the amount of the formed film) becomes too small. Therefore, the ionic conductivity of the positive electrode active material tends to decrease and the resistance of the positive electrode sheet 50 tends to increase. Therefore, the content of the lithium fluorosulfonate in the non-aqueous electrolyte 80 is preferably 0.05% by mass or more. On the other hand, when the content of the lithium fluorosulfonate is too large, the amount of film formation becomes too large. Therefore, the electron conductivity of the positive electrode active material tends to decrease and the resistance of the positive electrode sheet 50 tends to increase. Therefore, the content of the lithium fluorosulfonate in the non-aqueous electrolyte 80 is preferably 3.0% by mass or less.

It is preferable that the non-aqueous electrolyte 80 further contains lithium bis(oxalato)borate. In this case, the lithium bis(oxalato)borate promotes a decomposition reaction of the non-aqueous electrolyte 80, and a more uniform film can be obtained. Furthermore, the resistance to capacity deterioration of the lithium ion secondary battery 100 when charge and discharge are repeated at a high rate is further improved. A content of the lithium bis(oxalato)borate in the non-aqueous electrolyte 80 is preferably 0.1% by mass or more, in that an effect of uniformizing the film by the lithium bis(oxalato)borate is enhanced. On the other hand, when the content of lithium bis(oxalato)borate is too large, the decomposition reaction of the non-aqueous electrolyte 80 may occur too much, and the effect of uniformizing the film may be reduced. Therefore, the content of the lithium bis(oxalato)borate in the non-aqueous electrolyte 80 is preferably 3.0% by mass or less, and more preferably 1.0% by mass or less.

It is preferable that the non-aqueous electrolyte 80 further contains lithium difluorophosphate. In this case, the lithium difluorophosphate is decomposed and taken into the film, and can improve the ionic conductivity of the film (particularly, conductivity of ions (such as Li) serving as charge carriers). Furthermore, the resistance to capacity deterioration of the lithium ion secondary battery 100 when charge and discharge are repeated at a high rate can be further improved. A content of the lithium difluorophosphate in the non-aqueous electrolyte 80 is preferably 0.1% by mass or more, in that an effect of improving the ionic conductivity by the lithium difluorophosphate is enhanced. On the other hand, when the content of the lithium difluorophosphate is too large, the amount of film formation becomes too large, which may cause an increase in resistance of the positive electrode sheet 50. Therefore, the content of lithium difluorophosphate in the non-aqueous electrolyte 80 is preferably 3.0% by mass or less, and more preferably 1.0% by mass or less.

The non-aqueous electrolyte 80 may further contain a component other than the components described above, for example, various additives such as: a gas generating agent such as biphenyl (BP) and cyclohexylbenzene (CHB); and a thickener, as long as the effects of the present disclosure are not significantly impaired.

As described above, capacity deterioration of the lithium ion secondary battery 100 when charge and discharge are repeated at a high rate can be suppressed by adding the hydrated alumina to the boundary layer 58 between the positive electrode active material layer 54 and the insulating layer 56 and adding the lithium fluorosulfonate to the non-aqueous electrolyte 80. The reason is considered as follows.

In the related art, it is considered that the capacity deterioration of the lithium ion secondary battery when charging and discharging are repeated at a high rate occurs as follows.

The boundary layer contains the positive electrode active material. The boundary layer has higher resistance than resistance of the positive electrode active material layer, that is, there is a difference in resistance between the boundary layer and the positive electrode active material layer. Therefore, when charging and discharging are performed at a high rate, charge carriers (that is, ions such as Li ions) accumulate on a boundary layer side, without using the positive electrode active material contained in the boundary layer. As a result, SOC unevenness occurs, and the boundary layer serves as a starting point of deterioration of the entire positive electrode. Thus, capacity deterioration of the lithium ion secondary battery occurs.

However, in the present embodiment, the hydrated alumina is contained in the boundary layer 58 between the positive electrode active material layer 54 and the insulating layer 56, and the lithium fluorosulfonate is added to the non-aqueous electrolyte 80. The lithium fluorosulfonate decomposes to form a film on the surface of the positive electrode active material. Therefore, a film is formed on the entire surface layer portion of the positive electrode active material layer 54. Since the film has electronic resistance, the resistance of the entire surface layer portion of the positive electrode active material layer 54 increases.

On the other hand, in the boundary layer 58, it is considered that the hydrated alumina generates an acid (such as HF), and the acid reacts with the lithium fluorosulfonate to suppress the formation of the film. Therefore, in the boundary layer 58, the resistance hardly increases.

As a result, the difference in resistance between the entire surface layer portion of the positive electrode active material layer 54 and the boundary layer 58 is reduced, and the SOC unevenness is eliminated. Accordingly, deterioration of the positive electrode sheet 50 is suppressed, and the capacity deterioration of the lithium ion secondary battery 100 is suppressed.

The lithium ion secondary battery 100 configured as described above can be used for various applications. Suitable applications include a power supply for drive which is mounted on a vehicle such as electric vehicles (EV), hybrid vehicles (HV), and plug-in hybrid vehicles (PHV). The lithium ion secondary battery 100 can also be typically used in the form of a battery pack in which a plurality of batteries is connected in series and/or in parallel.

As an example, the rectangular lithium ion secondary battery 100 including the flat wound electrode body 20 is described. However, the non-aqueous electrolyte secondary battery disclosed herein can also be configured as a lithium ion secondary battery including a stacked electrode body. Also, the non-aqueous electrolyte secondary battery disclosed herein can also be configured as a cylindrical lithium ion secondary battery, a laminated lithium ion secondary battery, a coin type lithium ion secondary battery, or the like. In addition, the non-aqueous electrolyte secondary battery disclosed herein can be configured as a non-aqueous electrolyte secondary battery other than the lithium ion secondary battery.

Hereinafter, examples according to the present disclosure will be described, but it is not intended that the present disclosure is limited to those shown in the examples.

Production of Lithium Ion Secondary Battery for Evaluation $LiNi_{0.34}Co_{0.33}Mn_{0.33}O_2$ (LNCM) having a layered rock salt structure as a positive electrode active material, acetylene black (AB) as a conductive material, and polyvinylidene fluoride (PVdF) as a binder were mixed with N-methyl-2-pyrrolidone (NMP) at a mass ratio of LNCM:AB:PVdF=100:13:13, and a paste for forming a positive electrode active material layer was prepared.

Aluminum oxyhydroxide (AlOOH) as an inorganic filler and PVdF as a binder were mixed with N-methyl-2-pyrrolidone (NMP) in a mass ratio of AlOOH:PVdF=100:13, and a paste for forming an insulating layer was prepared.

$LiNi_{0.34}Co_{0.33}Mn_{0.33}O_2$ (LNCM) having a layered rock salt structure, aluminum oxyhydroxide (AlOOH), and PVdF were mixed with N-methyl-2-pyrrolidone (NMP) in a mass ratio of LNCM:AlOOH:PVdF=50:50:13, and a paste for forming a boundary layer was prepared.

The three pastes were applied on an aluminum foil, dried, and then subjected to a press processing, whereby a positive electrode sheet was produced. In this case, a boundary layer was formed between the positive electrode active material layer and the insulating layer. The boundary layer was formed so as to be in contact with the positive electrode active material layer and the insulating layer as shown in FIG. 3.

In addition, natural graphite (C) as a negative electrode active material, styrene butadiene rubber (SBR) as a binder, and carboxymethyl cellulose (CMC) as a thickener were mixed with ion-exchanged water at a mass ratio of C:SBR:CMC=98:1:1, and a paste for forming a negative electrode active material layer was prepared. The paste for forming a negative electrode active material layer was applied on a copper foil, dried, and then subjected to a press processing, whereby a negative electrode sheet was produced.

In addition, a porous polyolefin sheet was prepared as a separator sheet.

A mixed solvent containing ethylene carbonate (EC), ethyl methyl carbonate (EMC), and dimethyl carbonate (DMC) in a volume ratio of 1:1:1 was prepared, and $LiPF_6$ as a supporting salt was dissolved in the mixed solvent at a concentration of 1.0 mol/L. Further, a lithium non-aqueous electrolyte was prepared by adding lithium fluorosulfonate ($LiFSO_3$), lithium difluorophosphate ($LiPO_2F_2$), and lithium bis(oxalato)borate (LiBOB) so as to have the contents shown in Table 1.

An electrode body was produced using the positive electrode sheet, the negative electrode sheet, and the separator, and the electrode body was housed in a battery case together with the non-aqueous electrolyte. In this manner, a lithium ion secondary battery for evaluation of each of Examples and Comparative Examples was produced.

Evaluation of Cycle Characteristic

Each of lithium ion secondary batteries for evaluation produced above was placed in an environment of 25° C. Activation (initial charge) was performed by a constant current-constant voltage method. Each lithium ion secondary battery for evaluation was charged at a constant current up to 4.2 V at a current value of ⅓ C, and then charged at a constant voltage until the current value became ⅕₀ C, to be in a fully charged state. Thereafter, each lithium ion secondary battery for evaluation was discharged at a constant current to 3.0 V at a current value of ⅓ C. The discharge capacity at this time was measured to determine an initial capacity.

Each of the activated lithium ion secondary batteries for evaluation is placed in an environment of 25° C., and charge and discharge are repeated 1000 cycles, in which, in one cycle, constant current charging was performed at 50 A to 4.0 V and constant current discharging was performed at 50 A to 3.5 V. The discharge capacity at the 1000th cycle was determined in the same manner as the initial capacity. As an index of cycle characteristic (durability), a capacity retention ratio (%) was determined from (Discharge Capacity at 1000th Charge and Discharge Cycle/Initial Capacity)×100. Results are shown in Table 1.

TABLE 1

|  | Mixed layer | | Electrolyte | | | Capacity |
| --- | --- | --- | --- | --- | --- | --- |
|  | Kind of Al material | Average particle diameter (μm) | $LiSO_3$ (% by mass) | $LiPO_2F_2$ (% by mass) | LiBOB (% by mass) | retention ratio (%) |
| Example 1 | Aluminum oxyhydroxide | 0.3 | 0.05 | 0 | 0 | 83 |
| Example 2 | Aluminum oxyhydroxide | 0.3 | 0.05 | 0.1 | 0.1 | 85 |
| Example 3 | Aluminum oxyhydroxide | 0.5 | 0.05 | 0 | 0 | 92 |
| Example 4 | Aluminum oxyhydroxide | 0.5 | 0.05 | 0.1 | 0.1 | 95 |
| Example 5 | Aluminum oxyhydroxide | 0.5 | 3 | 0 | 0 | 93 |
| Example 6 | Aluminum oxyhydroxide | 0.5 | 3 | 0.1 | 0.1 | 96 |
| Example 7 | Aluminum oxyhydroxide | 3 | 0.05 | 0 | 0 | 88 |
| Example 8 | Aluminum oxyhydroxide | 3 | 0.05 | 0.1 | 0.1 | 90 |
| Example 9 | Aluminum oxyhydroxide | 3 | 3 | 0 | 0 | 89 |
| Example 10 | Aluminum oxyhydroxide | 3 | 3 | 0.1 | 0.1 | 92 |
| Example 11 | Aluminum oxyhydroxide | 4 | 0.05 | 0 | 0 | 79 |
| Example 12 | Aluminum oxyhydroxide | 4 | 0.05 | 0.1 | 0.1 | 80 |
| Example 13 | Aluminum oxyhydroxide | 2 | 2 | 0.1 | 0.1 | 97 |
| Example 14 | Aluminum oxyhydroxide | 3 | 0.9 | 0.1 | 0 | 89 |
| Example 15 | Aluminum oxyhydroxide | 3 | 0.9 | 0 | 0.1 | 89 |
| Comparative Example 1 | Aluminum oxide | 1 | 0.05 | 0 | 0 | 65 |
| Comparative Example 2 | Aluminum oxide | 1 | 3 | 0 | 0 | 61 |
| Comparative Example 3 | Aluminum oxide | 1 | 0.05 | 0.1 | 0.1 | 63 |

TABLE 1-continued

|  | Mixed layer | | Electrolyte | | | Capacity |
| --- | --- | --- | --- | --- | --- | --- |
|  | Kind of Al material | Average particle diameter (μm) | LiSO$_3$ (% by mass) | LiPO$_2$F$_2$ (% by mass) | LiBOB (% by mass) | retention ratio (%) |
| Comparative Example 4 | Aluminum oxyhydroxide | 3 | 0 | 0 | 0 | 60 |

In Table 1, it can be seen that, in Examples 1 to 15 in which the boundary layer between the positive electrode active material layer and the insulating layer contains hydrated alumina and the non-aqueous electrolyte 80 contains the lithium fluorosulfonate, the capacity retention ratio after the charging and discharging was repeated at a high rate is high (that is, the capacity deterioration is small).

On the other hand, in Comparative Examples 1 to 3 in which aluminum oxide having no hydroxyl group was used as the aluminum material, the capacity retention ratio was low (that is, the capacity deterioration was large). In Comparative Example 4 in which the non-aqueous electrolyte did not contain lithium fluorosulfonate, the capacity retention ratio was low (that is, the capacity deterioration was large).

Therefore, it can be seen that the non-aqueous electrolyte secondary battery disclosed herein suppresses capacity deterioration when charging and discharging are repeated at a high rate.

As above, although the specific examples of the present disclosure were described in detail, the specific examples are merely illustrations and do not limit claims. The technique described in the claims includes various modifications and changes of the specific examples illustrated above.

What is claimed is:

1. A non-aqueous electrolyte secondary battery comprising:
   a positive electrode;
   a negative electrode; and
   a non-aqueous electrolyte, wherein:
   the positive electrode includes a positive electrode current collector, and a positive electrode active material layer, an insulating layer, and a boundary layer which are provided on the positive electrode current collector;
   the boundary layer is positioned between the positive electrode active material layer and the insulating layer, and is in contact with the positive electrode active material layer and the insulating layer;
   the positive electrode active material layer contains a positive electrode active material;
   the insulating layer contains an inorganic filler;
   the boundary layer contains the positive electrode active material contained in the positive electrode active material layer and the inorganic filler contained in the insulating layer;
   the boundary layer contains hydrated alumina; and
   the non-aqueous electrolyte contains lithium fluorosulfonate.

2. The non-aqueous electrolyte secondary battery according to claim 1, wherein the hydrated alumina has an average particle diameter of 0.5 μm or greater and 3 μm or smaller.

3. The non-aqueous electrolyte secondary battery according to claim 1, wherein the non-aqueous electrolyte further contains lithium bis(oxalato)borate.

4. The non-aqueous electrolyte secondary battery according to claim 1, wherein the non-aqueous electrolyte further contains lithium difluorophosphate.

5. The non-aqueous electrolyte secondary battery according to claim 1, wherein the hydrated alumina is aluminum oxyhydroxide.

* * * * *